(12) United States Patent
Guduru

(10) Patent No.: US 9,036,707 B2
(45) Date of Patent: May 19, 2015

(54) METHOD AND APPARATUS FOR FINDING A MOTION VECTOR

(75) Inventor: Vijaykrishna P. Guduru, Denville, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 387 days.

(21) Appl. No.: 13/465,557

(22) Filed: May 7, 2012

(65) Prior Publication Data

US 2013/0294516 A1    Nov. 7, 2013

(51) Int. Cl.
*H04N 11/02* (2006.01)
*H04N 19/53* (2014.01)
*H04N 19/172* (2014.01)
*H04N 19/61* (2014.01)
*H04N 19/132* (2014.01)

(52) U.S. Cl.
CPC ............ *H04N 19/53* (2014.11); *H04N 19/172* (2014.11); *H04N 19/61* (2014.11); *H04N 19/132* (2014.11)

(58) Field of Classification Search
None
See application file for complete search history.

(56) References Cited

U.S. PATENT DOCUMENTS

2009/0207915 A1*   8/2009   Yan et al. ................. 375/240.16

* cited by examiner

*Primary Examiner* — Sath V Perungavoor
*Assistant Examiner* — Janese Duley

(57) ABSTRACT

Methods and related systems for encoding video streams are described. Reference and target frames of a video stream are scaled to reduce their resolution. A sliding window is used to compare the reduced resolution reference and target frames and identify blocks, outlined by a sliding window, that include similar content. A motion vector indicating the motion of the identified similar content is determined. Once the motion vector is determined, the reference and target frames are restored to their native resolution and a translated location for the motion vector is identified in the restored frames. The translated location of the motion vector may be used in encoding the frames of the video stream.

22 Claims, 4 Drawing Sheets

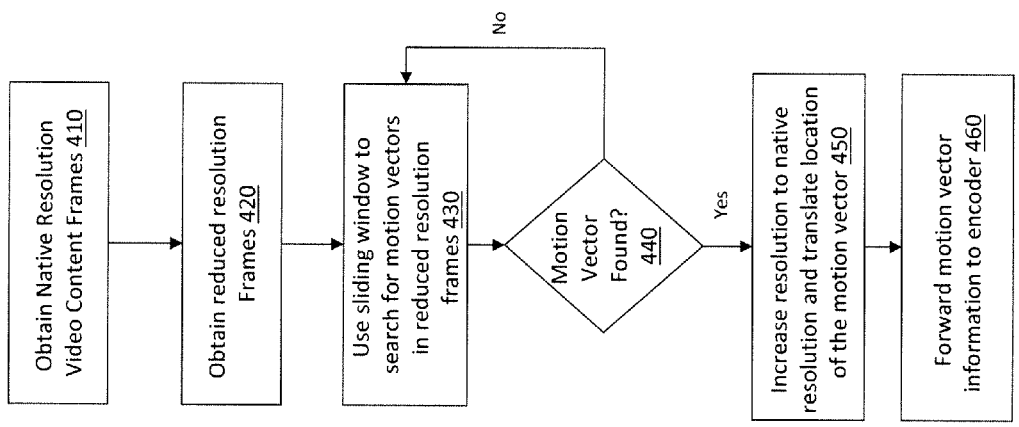

METHOD AND APPARATUS FOR FINDING A MOTION VECTOR

BACKGROUND

Processing video data may be a computationally complex task due to the high data rates involved. For example, television quality video may require up to 27 Mega Bytes per second. Such data sizes and rates may stress networks and make real-time processing of video data cumbersome. Accordingly, video data is often stored in a compressed format.

Motion vectors are often used for motion estimation in video compression to describe transformation from one two-dimensional (2-D) image to another 2-D image. Motion vectors may be used to represent transformation of a whole image (e.g., in a global motion estimation problem), specific parts of the image (e.g., blocks, or patches), or individual pixels of the image.

Motion estimation is a highly ill-posed problem since the frames (images) are obtained from projection of a three-dimensional (3-D) medium onto a 2-D plane. This renders the problem of searching for and determining the motion vector complex and computationally intensive. Available schemes for finding motion vectors often approach this problem by initializing a search at a location, such as the (0,0) location of a macroblock, and searching for the motion vector in the entire macroblock, thereby consuming a significant amount of power and central processing resources.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 is a flow diagram of procedures for locating a motion vector according to certain embodiments disclosed herein.

DETAILED DESCRIPTION

Figure 1:
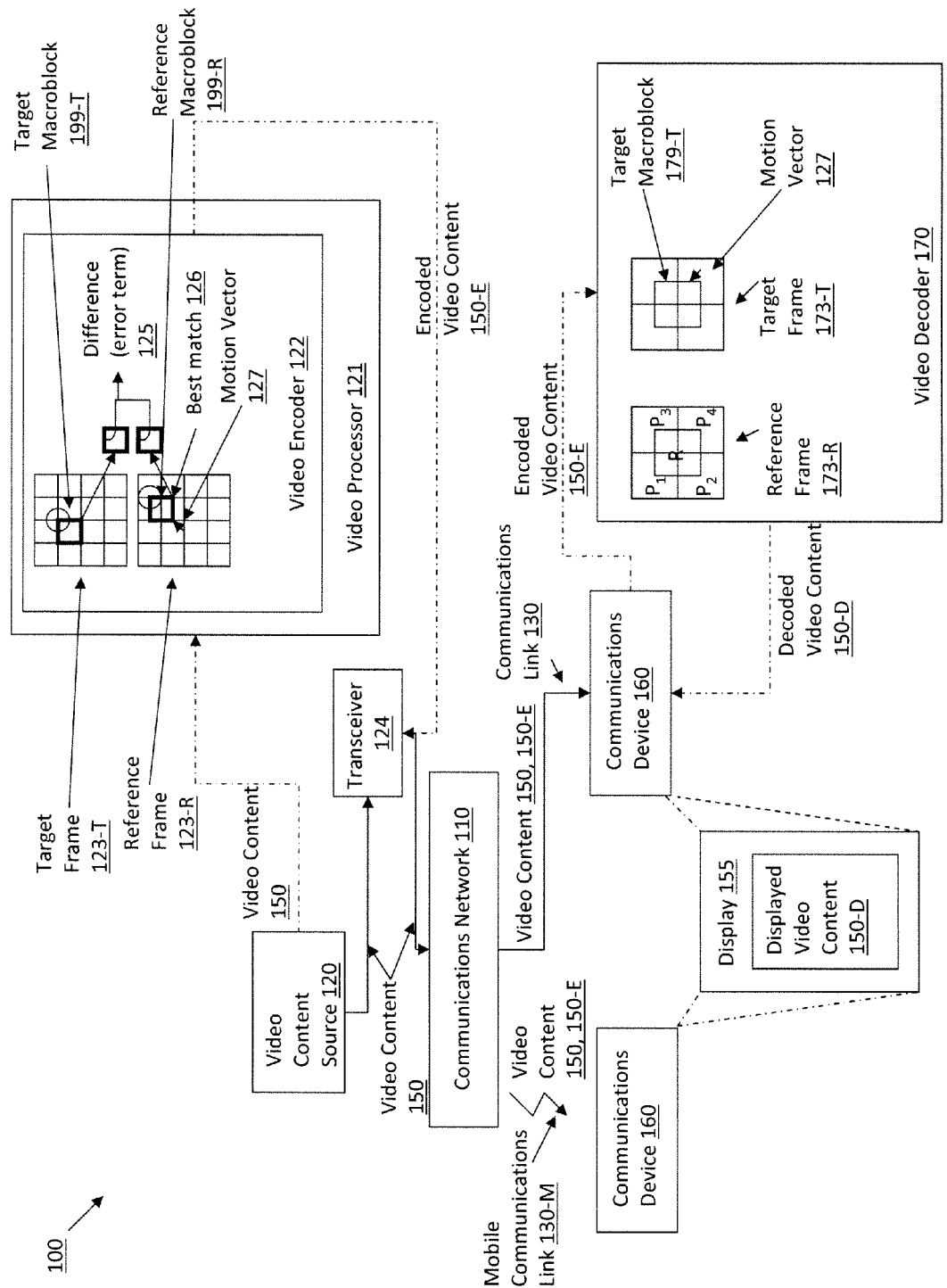
FIG. 1 is an illustration of a perspective view of a communications system that may be used with certain embodiments disclosed herein

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Certain embodiments disclosed herein relate methods and related systems for determining a motion vector. In some embodiments, resolution of a reference frame and a target frame belonging to a sequence of video frames is reduced and a block of the reference frame, outlined by a sliding window, is compared with a corresponding block in the target frame to identify content included in both the reference frame and the target frame. A motion vector indicating direction of motion of the identified content between the reference target and target frame is determined and the resolution of the reference frame and the target frame is adjusted to adjusted resolutions. The location of the motion vector within the adjusted reference frame is also determined. The adjusted target frame, the adjusted reference frame, and the determined location of the motion vector within the adjusted reference frame are forwarded for use in encoding the sequence of video frames.

The resolutions of the reference frame and the target frame may be reduced by performing at least one of down-sampling or scaling the reference frame and the target frame by a predetermined factor. The resolution of the reference frame and the target frame may be adjusted to the adjusted resolutions by performing at least one of down sampling, scaling, or up-sampling the reference frame and the target frame to their original resolutions.

In some embodiments, the sliding window may be quadrilateral. In some embodiments, the block of the reference frame may be compared with the corresponding block in the target frame by determining a numerical metric that indicates the similarities between the block of the reference frame and the corresponding block in the target frame. In some embodiments, the numerical metric may include a statistical distance between the block of the reduced resolution reference frame and the corresponding block in the reduced resolution target frame In certain embodiments, the numerical metric may be compared against a predetermined threshold and in an event the numerical metric falls below the predetermined threshold, the identification of the content included in both the reference frame and the target frame may be declared. In certain embodiments, an error metric indicating differences between the block of the reference frame including the identified content and the corresponding block in the target frame may be identified. The error metric may be forwarded for use in encoding the sequence of video frames. In some embodiments, the error metric may be used, along with the motion vector, in encoding the sequence of video frames.

In certain embodiments, the motion of the identified content may include a change in at least one of position or orientation of the identified content between the reference target and target frame.

In certain embodiments resolution of a reference frame and a target frame belonging to a sequence of video frames is reduced in order to produce a reduced resolution reference frame and a reduced resolution target frame. A block of the reduced resolution reference frame, outlined by a diamond-shaped sliding window, is compared with a corresponding block in the reduced resolution target frame and content included in both the reference frame and the target frame is identified. A motion vector indicating direction of motion of the identified content between the reference target and target frame is determined and the determined motion vector is forwarded to an encoder for use in encoding the sequence of video frames.

In certain embodiments the resolution of the reduced resolution reference frame and the reduced resolution target frame may be adjusted to adjusted resolutions (e.g., scaled, lower, or higher resolutions) and the motion vector within the adjusted resolution reference frame may be determined.

FIG. 1 is an illustration of a perspective view of a communications system 100 according to certain embodiments described herein. A video content source 120 may distribute information, including video content 150, using a transceiver 124, over a communications network 110 to one or more communications devices 160 (hereinafter collectively referenced as communications device 160).

The communications device 160 may be a wireless (e.g., mobile) communications device with video capabilities. The module that provides the device with video capabilities may be built-into the device 160 or be coupled with the device 160.

In certain embodiments, the communications device 160 may include a display 155 for displaying the video content 150-D. In certain embodiments, the display 155 may be a built-in display. In some embodiments, the display 155 may be a separate unit that is coupled (either wirelessly or through a physical connection) with the communications device 160.

Depending on the type of communications device 160 used, the communications device 160 may connect to the communications network 110 through a wireless 130-M or wired communications link 130 (e.g., network link). The communications network 110 may be a dedicated video distribution network (e.g., direct broadcast satellite network or cable television network) that distributes video content 150 from the video content source 120. In some embodiments, the network may include one or more segments of a general purpose network (e.g., Internet, local area network (LAN)) and/or other networks (e.g., Internet protocol (IP) network).

The communications device 160 may include a receiver (not shown, e.g., wireless receiver) for receiving the video content 150. The receiver may be a built-in receiver. In certain embodiments, the communications device 160 may receive the video content 150 through mediums such as a data card, modem, LAN link, or other link or device that, alone or in combination with other devices, is capable of receiving the video content 150 from the communications network 110 and displaying (and, if needed, storing) the video content 150.

The video content 150 may include any video program content. For example, video content 150 such as television shows, movies, video games, video clips, educational content, infomercials, commercials, advertisements, etc. may be distributed from the video content source 120 to the communications device 160. In certain embodiments, in addition to, or in place of, the video content 150, other information such as audio, control data, programming data, management data, graphics data, etc. may be transmitted from the video content source 120 to the communications device 160. The video content 150 may or may not include associated audio content (not shown).

In certain embodiments, the video content 150 may be forwarded as video on demand, near video on demand, streaming video, broadcast video, and/or other video content.

In certain embodiments, the video content 150 may be formatted using various standards known in the art. Further, in some embodiments, the video content 150 may be carried as analog signals (e.g., Phase Alternating Line (PAL), Sequentiel Couleur A Memoire (SECAM), or National Television System Committee (NTSC)). In some embodiments, digital video content 150 (e.g., QuickTime or Moving Picture Experts Group (MPEG)) may be used.

In some embodiments, pre-processing may be applied to the video content 150 prior to transmission. Specifically, the video content 150 from the video source may be forwarded for pre-processing to a video processor 121 prior to transmission. The video processor 121 may include a video encoder 122 that encodes the video content 150. The video encoder 121 may be positioned locally within the video content source 120 or be downstream with respect to the video content source 120 (e.g., within the communications network 110). The video encoder 122 may be implemented in hardware, software, or firmware.

The video encoder 122 may encode the video content 150 according to encoding schemes known in the art. For example, in some embodiments, the video content 150 may be encoded via an MPEG compression scheme. The encoded video content 150-E may be encoded such that it can be decoded at the communications device 160 end, using known decoding techniques. The encoded video content may be manipulated, using available techniques, for more feasible transmission. For example, in certain embodiments, video compression may be applied. In some embodiments, the encoded video content 150-E may include less than full resolution or scale. In certain embodiments, the encoded video content may include less than the complete information included in the video content 150-E prior to being decoded.

In some embodiments, motion compensation may be applied in encoding of the video content 150. Specifically, each frame in the video content sequence 150 may be encoded, as known, as an I-frame, a P-frame, or a B-frame. The I-frames are independent of other frames. The B-frames and P-frames are encoded as a difference from nearby I- or P-frames. These frames are also referred to as reference frames 123-R.

In some embodiments, the video encoder 122 may perform video encoding by partitioning a video frame into macroblocks and processing the macroblocks. Macroblocks are typically used in video compression and motion estimation to represent two or more blocks of pixels. For example, a current frame (also referred to as the target frame 123-T) of a video stream may be divided into a grid of blocks, each containing a number of pixels, and these blocks may be used to form a macroblock. For example, the video encoder 122 may partition a current frame into macroblocks of certain dimensions (e.g., 16×16 pixel macroblocks). Each macroblock in the current frame 123-T may be encoded by searching for a macroblock in the reference frame 123-R (i.e., the most recent I- or P-frame) that best matches a macroblock in a current frame 123-T. Various metrics, such as mean squared error or mean absolute error or sum of absolute differences between the pixels in a macroblock in the reference frame 123-R and a macroblock in the current frame 123-T, may be used to search for a macroblock in the reference frame 123-R that best matches a macroblock in the current frame 123-T. In certain embodiments, the metric may be a statistical metric. In some embodiments, the metric may be at least one of a positive correlation coefficient, a negative correlation coefficient, etc.

In some embodiments, the numerical metric may include a statistical distance between the block of the reduced resolution reference frame and the corresponding block in the reduced resolution target frame.

The video encoder 121 may determine the difference 125 in coordinates between the target macroblock 199-T and the reference macroblock 199-R. The pixel-wise difference 125 may be represented by an error term 125.

The video encoder 121 may also determine the best match between a target macroblock 199-T and a reference macroblock 199-R. The best match 126 may be represented in the form of a motion vector 127. The error term 125 and the motion vector 127 may be encoded and stored in the encoded video content 150-E. In some embodiments, the error term 125 may be compressed and stored with the motion vector 127 in a compressed video stream. In certain embodiments, the motion vector 127 and error term 125 data may be stored in a separate stream from the encoded video content 150-E. In certain embodiments, the motion vector 127 and error term 125 obtained from a layer of a multi-layer image may be used by other layers of the image to determine location of a motion within those layers. For example, in one embodiment, the motion vector 127 and error term 125 obtained from a lower layer of a multi-layered image may be used by an upper layer to determine the location of the motion vector within that upper layer.

Regardless of whether video content 150 is encoded, the video content 150, 150E is transmitted as a stream using a transceiver that may be local or downstream with respect to the video content source 120 through the communications network 110.

Once received by the communications device 160, the video content 150 may be displayed on a display 155 of the communications device 160. Encoded video content 150-E is decoded prior to being displayed. Specifically, a video decoder 170 may be used to decode the encoded video content 150-E. The video decoder 170 may be positioned locally within the communications device 160 or be coupled to the communications device 160, for example via a network connection. In some embodiments, the video decoder 170 may produce a decoded image having a resolution lower than the original video content 150. The lower resolution image may be produced to compensate for any possible loss that may have occurred during encoding of the image. In certain embodiments, the lower resolution image may be produced in response to restrictions imposed by the communications device 160. For example, in certain embodiments, the communications device 160 may impose certain display resolution limitations on the video content 150. In such circumstances, the video decoder 170 may produce the decoded image at a lower resolution that is feasible for displaying on the communications device 160.

In some embodiments, in order to decode a received target frame 173-T, all relevant received reference frames 173-R are first decoded. The error term 125 and motion vector 127 are also extracted from the encoded video content 150-E. The error term 125 is added, pixel-wise, to a pixel block (e.g., $P_1$, $P_2$, $P_3$, $P_4$) of the received reference frame 173-R indicated by the motion vector 127.

Figure 2:
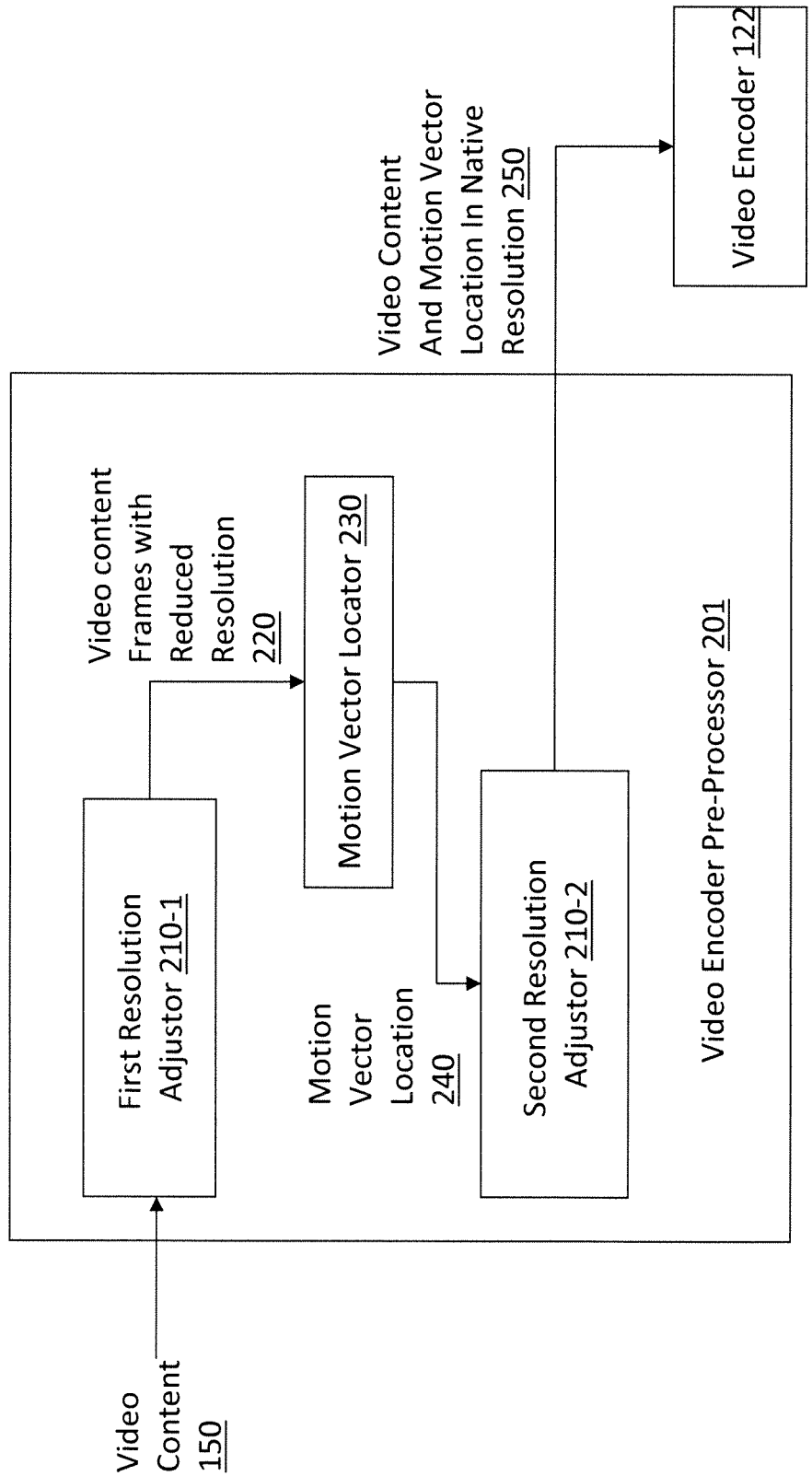
FIG. 2 is a block diagram of a video encoder pre-processor according to certain embodiments disclosed herein.

FIG. 2 is a block diagram of a video encoder pre-processor 201 according to certain embodiments described herein. In order to provide an initial point for finding motion vectors 127 that are used in encoding of the video content 150, certain embodiments disclosed herein employ a video encoder pre-processor 201. The video encoder pre-processor 201 may include a first resolution adjustor 210-1, a motion vector locator module 230, and a second resolution adjustor 210-2. In some embodiments, the first and second resolution adjustors 210-1, 210-2 may be single operating unit (e.g., both adjustors contained within a single circuit module).

The first resolution adjustor 210-1 may be used to reduce the native resolution of the video content 150 frames. In certain embodiments, the first resolution adjustor 210-1 may down-sample the video content 150 frames by a predetermined factor. The predetermined sampling factor may be imposed by the pre-processor 201 or be a function of a compression scheme used by the pre-processor 201. In certain embodiments, the predetermined factor may be set as a function of at least one of the bandwidth available for transmission of the frames, the transmission medium, and any resolution limit set by the communications medium or to improve battery life performance of device. For example, in some embodiments, the resolution adjustor 210 may adjust the resolution of the video frames by a factor of 2×2.

The motion vector locator 230 may perform a motion vector search on the video content frames with reduced resolution 220. In some embodiments, the motion vector locator 230 may utilize a reference frame (not shown) and a target frame (not shown), selected from the reduced resolution video content frames 220, to locate the motion vectors 127 that may be used for encoding the frames 220.

In certain embodiments, a sliding window (not shown) may be used to search the video content frames with reduced resolution 220. In some embodiments, the sliding window may be quadrilateral. In certain embodiments, the sliding window may be diamond shaped. The sliding window may be used to search the reduced resolution reference and target frames and determine a best match between the pixels within the two frames. The determined best match may be used in locating the motion vector 127. Specifically, the sliding window may be used to compare a block in the reference frame with the blocks of the current frame and determine a block in the current frame that best matches the block in the reference frame. The motion vector location may then be determined as a function of the position of the block in the reference frame and the position of the block in the current frame. The determined motion vector may be used to provide an offset from the coordinates of the block in the reference block to the coordinates of the corresponding, best match, block in the current frame.

Once the motion vector location 240 is determined, the video content frames 220 may be adjusted to their original resolution. In some embodiments, once the motion vector location 240 is determined, the video content frames 220 may be adjusted to a size different from their original resolution. For example, in some embodiments, the video frames may be further reduced to a resolution lower than their already reduced resolution 220. In some embodiments, the video frames may be reduced to a resolution lower than their original resolution.

The second resolution adjustor 210-2 may up-sample/down-sample the reduced resolution video content frames 220 to a new resolution. The information regarding the location of the motion vector 240 is also considered during the up-sampling of the video content 220 to ensure that the resulting video content 250 includes the location of the motion vector 240 in the frames in their native resolution.

Figure 3:
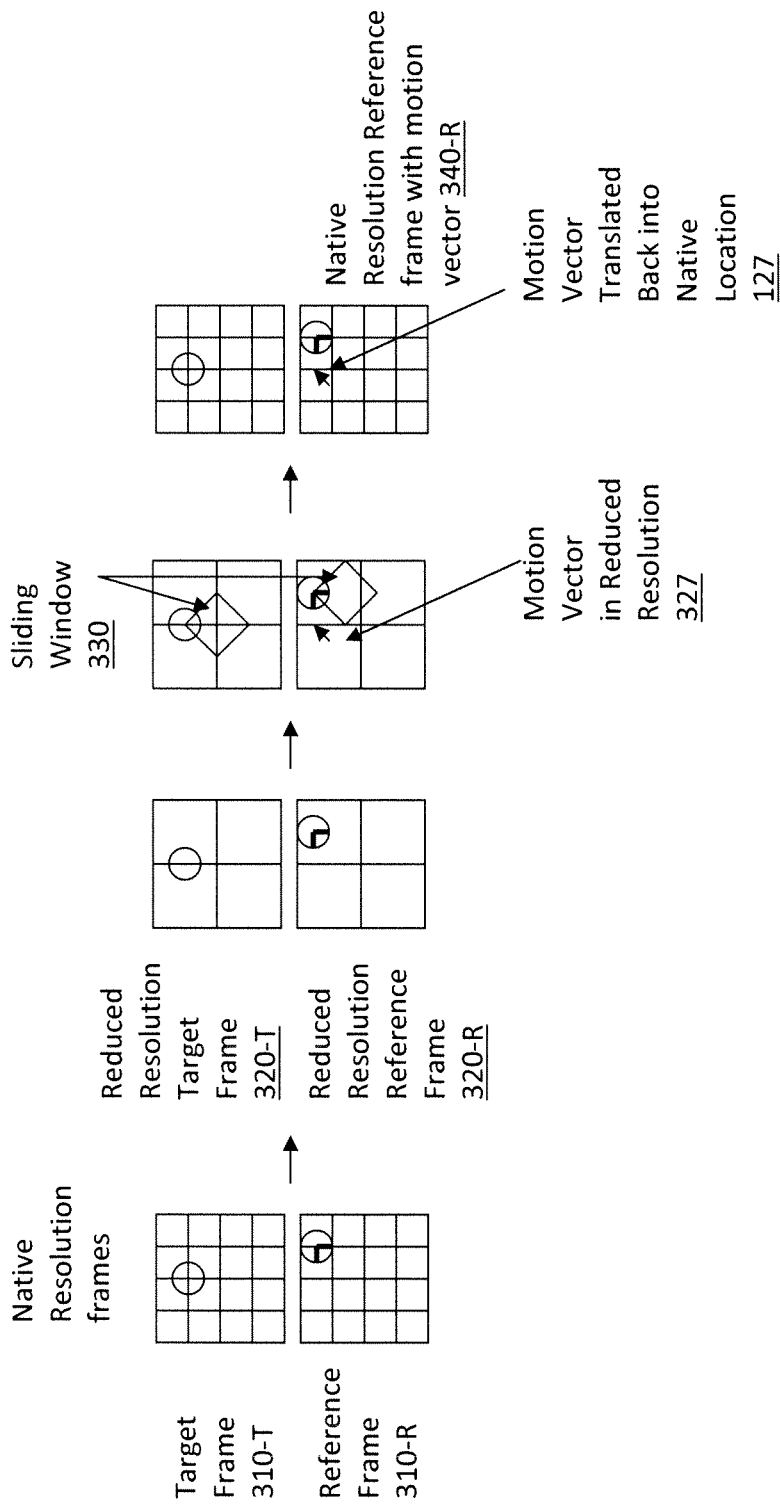
FIG. 3 is a block diagram of procedures for locating a motion vector according to certain embodiments disclosed herein.

The resulting video content and motion vector location 250 are forwarded to the video encoder 122 for further processing. The obtained pre-processed motion vector location may be directly used for encoding of the video frames or serve as an initial point for the motion estimation for encoding of the video frames. For example, in certain embodiments, the final motion vector may be used to decode frames of the video content. In certain embodiments, the final motion vector may be provided to a decoder that uses the determined motion vector information as initial information for locating the motion vector. In certain embodiments, the final motion vector will be used by upper layers in inter-layer coding of a video sequence FIG. 3 is a block diagram of procedures for locating a motion vector according to certain embodiments disclosed herein. As noted above, video content frames in native resolution 310 may be pre-processed to obtain the location of the motion vectors. Specifically, a target frame of video content 310-T and a reference frame of video content 310-R may be processed. The resolution of the native resolution frames 310-T, 310-R may be reduced, for example using the first resolution adjustor 210-1 (shown in FIG. 2).

The reduced resolution frames 320-T, 320-R may be searched using a sliding window 330 that searches for a best match among the pixels of the reduced resolution target 320-T and reference frames 320-R. In certain embodiments, a diamond shaped sliding window 330 may be used to search for the best match. In comparison to traditionally used square or rectangular blocks or a diamond shaped sliding window 330 may speed the process of search for a best match, since it may be able to consider a larger portion of the blocks of the reference and target frames at any given time the time. The diamond shaped nature of the sliding window allows for bypassing some of the pixels in the reference frame, thereby reducing the computational complexity and the number of operations required for determining the motion vector.

A best match may be obtained using various metrics such as the mean squared error or mean absolute error of the difference between the blocks covered by the sliding window 330 in the reference and target frames. Once evaluated, the value of the metric may be compared against a predetermined threshold, the value of which may be determined adaptively. Specifically, in certain embodiments, the value of the threshold may initially be small to allow a small metric (e.g., mean squared error) between the blocks of the reference and target frames. The value of the predetermined threshold may be set to a larger value, as one or more motion vectors are determined, to reduce the computational complexity associated with determining the motion vector.

In some embodiments, if the value of the metric falls below a certain threshold, a motion vector is located. In some embodiments, in an event the value of the metric, within the sliding window 330, falls below a first predetermined threshold, a series of searches within the sliding window is conducted and the metric (e.g., mean squared error or mean absolute error of the difference between the blocks covered by the sliding window 330 in the reference and target frames) is calculated for a second time. A motion vector is located, if the value of the metric, as calculated for the second time, falls below a certain threshold. In certain embodiments, the metric calculated for the second time may be different from the metric initially calculated.

Once a best match is obtained, the location of motion vector 327 may be determined. The reduced resolution frames 320-R and 320-T may then be scaled back to their native resolution (e.g., using second resolution adjustor 210-2). The location of the motion vector in the reduced resolution frame 327 is also scaled and a corresponding location for the motion vector 127 in the native resolution is determined. The information regarding the location of the motion vector 127 in the native resolution image may be used, as initial information, in encoding of the video frames.

FIG. 4 is a flow diagram of procedures for locating a motion vector according to certain embodiments disclosed herein. Native resolution video content frames may be obtained 410 (e.g., from a video content source) and used to form reference and target video frames. Reduced resolution frames 420 may be obtained from the reference and target video frames. Available methods in the art may be used to reduce the resolution of the video content frames.

A sliding window, such a diamond shaped sliding window, may be used to search the reduced resolution reference and target frames for motion vectors 430.

A best match may be obtained using various metric such as the mean squared error or mean absolute error of the difference between the blocks covered by the sliding window 330 in the reference and target frames. Once evaluated, the value of the metric may be compared against a predetermined threshold and a motion vector is found 440 if the value of the metric falls below the predetermined threshold. If a motion vector is not found, the sliding window may further be moved 430 to continue the search for a best match.

If a motion vector is found, the resolution of the frames may be increased to their native resolution and the location of the determined motion vector may be translated to a corresponding location in the native resolution image 450. The information regarding location of the motion vector in the native resolution image may be forwarded to an encoder 450 that takes advantage of the information in encoding of the video content frames.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
reducing resolution of a reference frame belonging to a sequence of video frames to produce a reduced resolution reference frame;
reducing resolution of a target frame belonging to the sequence of video frames to produce a reduced resolution target frame;
identifying a first sliding window, the first sliding window outlining a first collection of pixels within the reduced resolution reference frame;
identifying a second sliding window, the second sliding window outlining a second collection of pixels within the reduced resolution target frame;
comparing the first collection of pixels outlined by the first sliding window with the second collection of pixels outlined by the second sliding window in order to identify when the first sliding window and the second sliding window each outline content included in both the reduced resolution reference frame and the reduced resolution target frame;
determining a motion vector indicating direction of motion of the identified content as a relationship between a location of the first sliding window within the reduced resolution reference frame when outlining the identified content and a location of the second sliding window within the reduced resolution target frame when outlining the identified content;
adjusting the resolution of the reduced resolution reference frame to produce an adjusted resolution reference frame;
adjusting the resolution of the reduced resolution target frame to produce an adjusted resolution target frame;
determining a location of the motion vector within the adjusted resolution reference frame; and
forwarding the adjusted resolution target frame, the adjusted resolution reference frame, and the determined location of the motion vector within the adjusted resolution reference frame to an encoder for use in encoding the sequence of video frames.

2. The method of claim 1 wherein adjusting the resolution of the reduced resolution reference frame and the reduced resolution target frame includes at least one of up-sampling, down-sampling, or scaling the reduced resolution reference frame and the reduced resolution target frame by a predetermined factor.

3. The method of claim 1 wherein the first and second sliding windows are quadrilateral.

4. The method of claim 1 wherein comparing the first collection of pixels outlined by the first sliding window with the second collection of pixels outlined by the second sliding window includes determining a numerical metric indicating similarities between the first and second collections of pixels.

5. The method of claim 4 wherein the numerical metric includes a statistical distance between the first and second sliding windows.

6. The method of claim 4 further including comparing the numerical metric against a predetermined threshold and in an event the numerical metric falls below the predetermined threshold, declaring identification of the content included in both the reference frame and the target frame.

7. The method of claim 6 further including determining an error metric indicating differences between the first collection of pixels outlined by the first sliding window and the second collection of pixels outlined by the second sliding window.

8. The method of claim 7 further including forwarding the error metric to the encoder for use in encoding the sequence of video frames.

9. The method of claim 7 further including encoding the sequence of video frames using the motion vector and the error metric.

10. A system comprising:
a video encoder; and
a video encoder pre-processor coupled to the video encoder, the video encoder pre-processor comprising a first resolution adjustor, a motion vector locator, and a second resolution adjustor,
wherein execution of the video encoder pre-processor configures the system to implement functions, including functions to:
reduce resolution, by the first resolution adjustor, of a reference frame belonging to a sequence of video frames to produce a reduced resolution reference frame;
reduce resolution, by the first resolution adjustor, of a target frame belonging to the sequence of video frames to produce a reduced resolution target frame;
identify a first sliding window, the first sliding window outlining a first collection of pixels within the reduced resolution reference frame;
identify a second sliding window, the second sliding window outlining a second collection of pixels within the reduced resolution target frame;
compare, by the motion vector locator, the first collection of pixels outlined by the first sliding window with the second collection of pixels outlined by the second sliding window in order to identify when the first sliding window and the second sliding window each outline content included in both the reduced resolution reference frame and the reduced resolution target frame;
determine, by the motion vector locator, a motion vector indicating direction of motion of the identified content as a relationship between a location of the first sliding window within the reduced resolution reference frame when outlining the identified content and a location of the second sliding window within the reduced resolution target frame when outlining the identified content;
adjust, by the second resolution adjustor, the resolution of the reduced resolution reference frame to produce an adjusted resolution reference frame;
adjust, by the second resolution adjustor, the resolution of the reduced resolution target frame to produce an adjusted resolution target frame; and
determine, by the motion vector locator, a location of the motion vector within the adjusted resolution reference frame.

11. The system of claim 10 wherein the functions to adjust, by the second resolution adjustor, the resolution of the reduced resolution reference frame and the reduced resolution target frame include functions to adjust the resolution by at least one of up-sampling, down-sampling, or scaling the reduced resolution reference frame and the reduced resolution target frame by a predetermined factor.

12. The system of claim 10 wherein the sliding windows are quadrilateral.

13. The system of claim 10 wherein the function to compare the first collection of pixels outlined by the first sliding window with the second collection of pixels outlined by the second sliding window comprises a function to determine a numerical metric indicating similarities between the first collection of pixels and the second collection of pixels.

14. The system of claim 13 wherein the numerical metric includes a statistical distance between the first sliding window and the second sliding window.

15. The system of claim 13 wherein the function to compare the first collection of pixels outlined by the first sliding window with the second collection of pixels outlined by the second sliding window further comprises a function to compare the numerical metric against a predetermined threshold and in an event the numerical metric falls below the predetermined threshold, declare identification of the content included in both the reference frame and the target frame.

16. The system of claim 15 wherein the functions further include a function to determine an error metric indicating differences between the first collection of pixels outlined by the first sliding window and the second collection of pixels outlined by the second sliding window.

17. The system of claim 16 wherein the implemented functions further include a function to forward, to the video encoder, the error metric for use in encoding the sequence of video frames.

18. The system of claim 16 wherein the functions further include a function to forward the adjusted resolution target frame, the adjusted resolution reference frame, and the determined location of the motion vector within the adjusted resolution reference frame to the video encoder for use in encoding the sequence of video frames.

19. A method comprising:
reducing resolution of a reference frame belonging to a sequence of video frames to produce a reduced resolution reference frame;
reducing resolution of a target frame belonging to the sequence of video frames to produce a reduced resolution target frame;
identifying a first diamond-shaped sliding window, the first diamond-shaped sliding window outlining a first collection of pixels within the reduced resolution reference frame;
identifying a second diamond-shaped sliding window, the second diamond-shaped sliding window outlining a second collection of pixels within the reduced resolution target frame;
comparing the first collection of pixels outlined by the first diamond-shaped sliding window with the second collection of pixels outlined by the second diamond-shaped sliding window in order to identify when the first diamond-shaped sliding window and the second diamond-shaped sliding window each outline content included in both the reduced resolution reference frame and the reduced resolution target frame;
determining a motion vector indicating direction of motion of the identified content as a relationship between a location of the first diamond-shaped sliding window within the reduced resolution reference frame when outlining the identified content and a location of the second diamond-shaped sliding window within the reduced resolution target frame when outlining the identified content; and
forwarding the determined motion vector to an encoder for use in encoding the sequence of video frames.

20. The method of claim 19 further including adjusting the resolution of the reduced resolution reference frame and the reduced resolution target frame to adjusted resolutions and determining the motion vector within the adjusted resolution reference frame.

21. A system comprising:
a video encoder; and
a video encoder pre-processor coupled to the video encoder, the video encoder pre-processor comprising a resolution adjustor and a motion vector locator,
wherein execution of the video encoder pre-processor configures the system to implement functions, including functions to:
reduce resolution, by the resolution adjustor, of a reference frame belonging to a sequence of video frames to produce a reduced resolution reference frame;
reduce resolution, by the resolution adjustor, of a target frame belonging to the sequence of video frames to produce a reduced resolution target frame;
identify a first diamond-shaped sliding window, the first diamond-shaped sliding window outlining a first collection of pixels within the reduced resolution reference frame;
identify a second diamond-shaped sliding window, the second diamond-shaped sliding window outlining a second collection of pixels within the reduced resolution target frame;
compare, by the motion vector locator, the first collection of pixels outlined by the first diamond-shaped sliding window with the second collection of pixels outlined by the second diamond-shaped sliding window in order to identify when the first diamond-shaped sliding window and the second diamond-shaped sliding window each outline content included in both the reduced resolution reference frame and the reduced resolution target frame; and
determine, by the motion vector locator, a motion vector indicating direction of motion of the identified content as a relationship between a location of the first diamond-shaped sliding window within the reduced resolution reference frame when outlining the identified content and a location of the second diamond-shaped sliding window within the reduced resolution target frame when outlining the identified content.

22. The system of claim 21, wherein:
the video encoder pre-processor further comprises a second resolution adjustor; and
further execution of the video pre-processor configures the system to implement functions, including functions to:
adjust, by the second resolution adjustor, the resolution of the reduced resolution reference frame to produce an adjusted resolution reference frame;
adjust, by the second resolution adjustor, the resolution of the reduced resolution target frame to produce an adjusted resolution target frame; and
determine, by the motion vector locator, a location of the motion vector within the adjusted resolution reference frame.

* * * * *